(12) United States Patent
Jarrett

(10) Patent No.: US 6,345,257 B1
(45) Date of Patent: Feb. 5, 2002

(54) COMPUTER BASED INTERACTIVE DEFECT REPORTING SYSTEM FOR THE PAPERLESS REPORTING OF PROBLEMS IN A VEHICLE FORMING PART OF A FLEET

(75) Inventor: Mark Jarrett, Beech Grove, IN (US)

(73) Assignee: National Railroad Passenger Corporation, Washington, DC (US)

( * ) Notice: Subject to any disclaimer, the term of this patent is extended or adjusted under 35 U.S.C. 154(b) by 0 days.

(21) Appl. No.: 09/210,481

(22) Filed: Dec. 14, 1998

(51) Int. Cl.[7] .................................................. G06F 11/00

(52) U.S. Cl. ............................................................. 705/1

(58) Field of Search ................................ 705/1; 701/29, 701/35; 702/183, 184

(56) References Cited

U.S. PATENT DOCUMENTS

| | | | | |
|---|---|---|---|---|
| 5,005,129 A | * | 4/1991 | Abe et al. ...................... | 701/31 |
| 5,214,582 A | * | 5/1993 | Gray ............................. | 701/33 |
| 5,297,193 A | | 3/1994 | Bouix et al. | |
| 5,313,388 A | * | 5/1994 | Cortis .......................... | 701/35 |
| 5,377,256 A | * | 12/1994 | Franklin et al. ............. | 455/404 |

(List continued on next page.)

FOREIGN PATENT DOCUMENTS

| | | | |
|---|---|---|---|
| EP | 0 573 171 A2 | 12/1993 | |
| EP | 0 675 625 A1 | 4/1995 | |
| EP | 0 845 894 A2 | 6/1998 | |
| EP | 0845894 A2 * | 6/1998 | ............ H04M/3/50 |
| EP | 0 845 894 A3 | 9/1999 | |
| GB | 2 321 889 A | 8/1998 | |
| JP | 10108277 * | 4/1998 | ............ H04Q/9/00 |

OTHER PUBLICATIONS

"Service Fleet Management Practices" Newton, C Transmission & Distribution World—v8n8 Aug. 1996.*
"No more Paper Orders with Mobile Data Software"—Electrical World—Dec., 1996—p48 vol. 210 No. 12.*
Patent Abstracts of Japan. vol. 1998, No. 09, Jul. 31, 1998 & JP 10 108277 A (Toshiba Eng Co Ltd), Apr. 24, 1998 abstract.
Patent Abstracts of Japan. vol. 016, No. 412 (E–1256), Aug. 31, 1992 & JP 04 137851 A (matsushita Electric Ind Co Ltd), May 12, 1992 abstract.

(List continued on next page.)

*Primary Examiner*—Vincent Millin
*Assistant Examiner*—Geoffrey Akers
(74) *Attorney, Agent, or Firm*—Lowe Hauptman Gilman & Berner, LLP

(57) ABSTRACT

An interactive defect reporting system is designed to handle enroute equipment problems and repairs in a paperless process that enables on-board personnel to report equipment problems using a phone. After calling the system, the on-board personnel describes the, problem in their own words in as much detail as necessary. The computerized reporting system assigns a unique Trouble Ticket number to the report and all subsequent repairs. Mechanics listen to the Trouble Tickets or have transcribed copies faxed to their facilities. Trouble Tickets are also immediately available to all downline maintenance facilities so that mechanics can prepared for problems on a train well in advance of its arrival. Once a problem is fixed, the mechanics called in the repair and describe in detail what was done to fix the problem. On-board personnel can listen to the repairs or request a fax copy of the Trouble Ticket. The system updates an existing nationwide master system that contains all information pertaining to trains within the fleet so that any one with access to the master system can also access the Trouble Tickets and repair histories therefor. The interactive defect reporting system also has the capability of updating the nationwide master system with repair codes and equipment problem histories for auditing purposes.

34 Claims, 15 Drawing Sheets

U.S. PATENT DOCUMENTS

| | | | | |
|---|---|---|---|---|
| 5,388,045 A | * | 2/1995 | Kamiya et al. | 701/35 |
| 5,442,553 A | * | 8/1995 | Parrillo | 455/420 |
| 5,453,939 A | * | 9/1995 | Hoffman et al. | 702/183 |
| 5,479,347 A | * | 12/1995 | Oguro et al. | 701/35 |
| 5,572,204 A | * | 11/1996 | Timm et al. | 340/988 |
| 5,631,831 A | * | 5/1997 | Bird et al. | 701/29 |
| 5,642,284 A | * | 6/1997 | Parupalli et al. | 701/30 |
| 5,646,865 A | * | 7/1997 | Alfaro et al. | 701/29 |
| 5,696,676 A | * | 12/1997 | Takaba | 701/31 |
| 5,809,437 A | * | 9/1998 | Breed | 701/29 |
| 5,948,025 A | * | 9/1999 | Sonoda | 701/29 |
| 6,006,146 A | * | 12/1999 | Usui et al. | 701/29 |
| 6,094,609 A | * | 7/2000 | Arjomand | 701/29 |
| 6,115,653 A | * | 9/2000 | Bergstrom et al. | 701/29 |

OTHER PUBLICATIONS

Patent Abstract of Japan. vol. 1998, No. 8, Jun. 30, 1998 & JP 10 076052 A (Toshiba Corp), Mar. 24, 1998 abstract.

Patent Abstracts of Japan. vol. 1998, No. 13, Nov. 30, 1998 & JP 10 2225654 A (Hitachi Building Syst Co Ltd), Aug. 21, 1998 abstract.

* cited by examiner

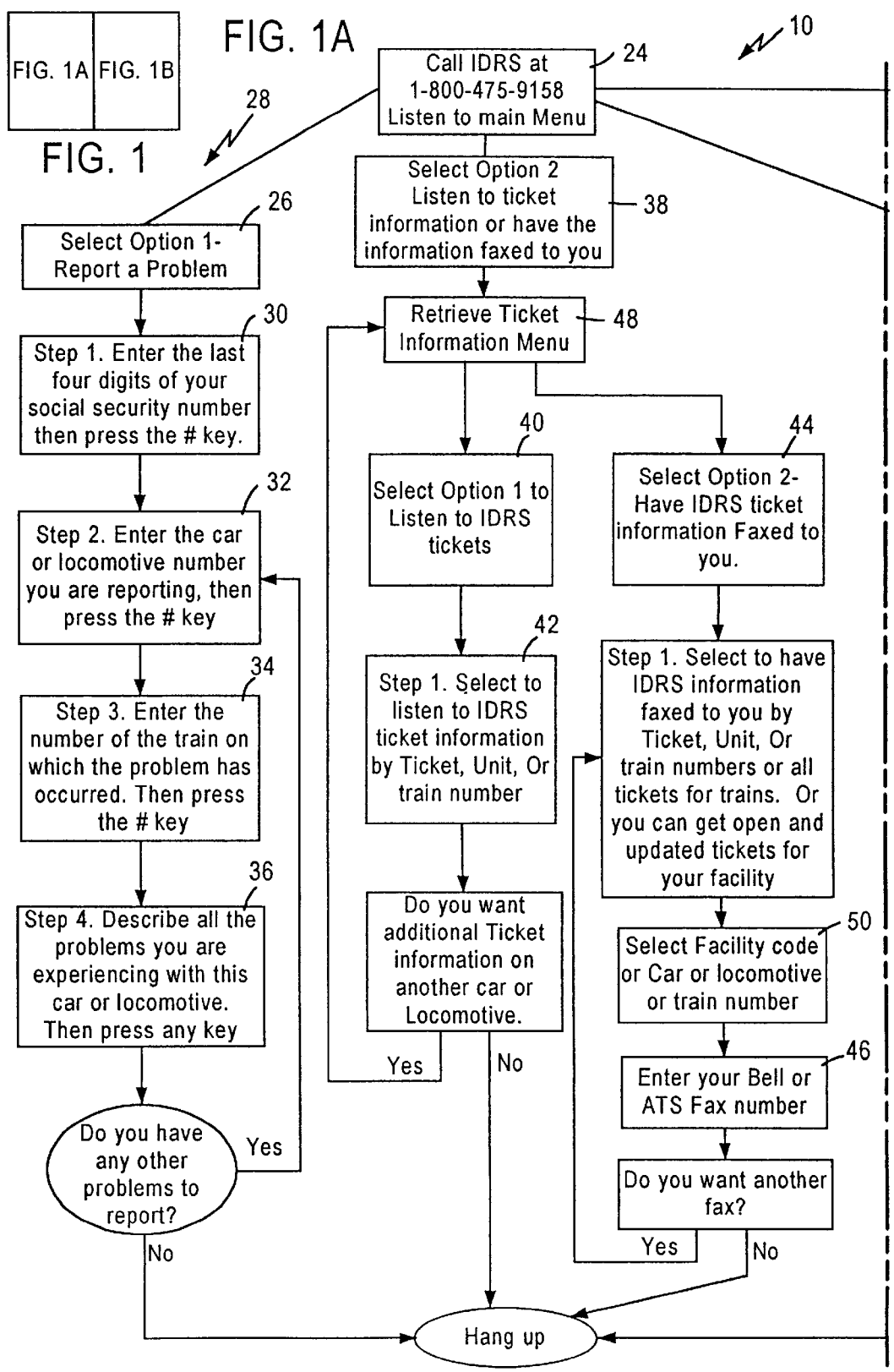

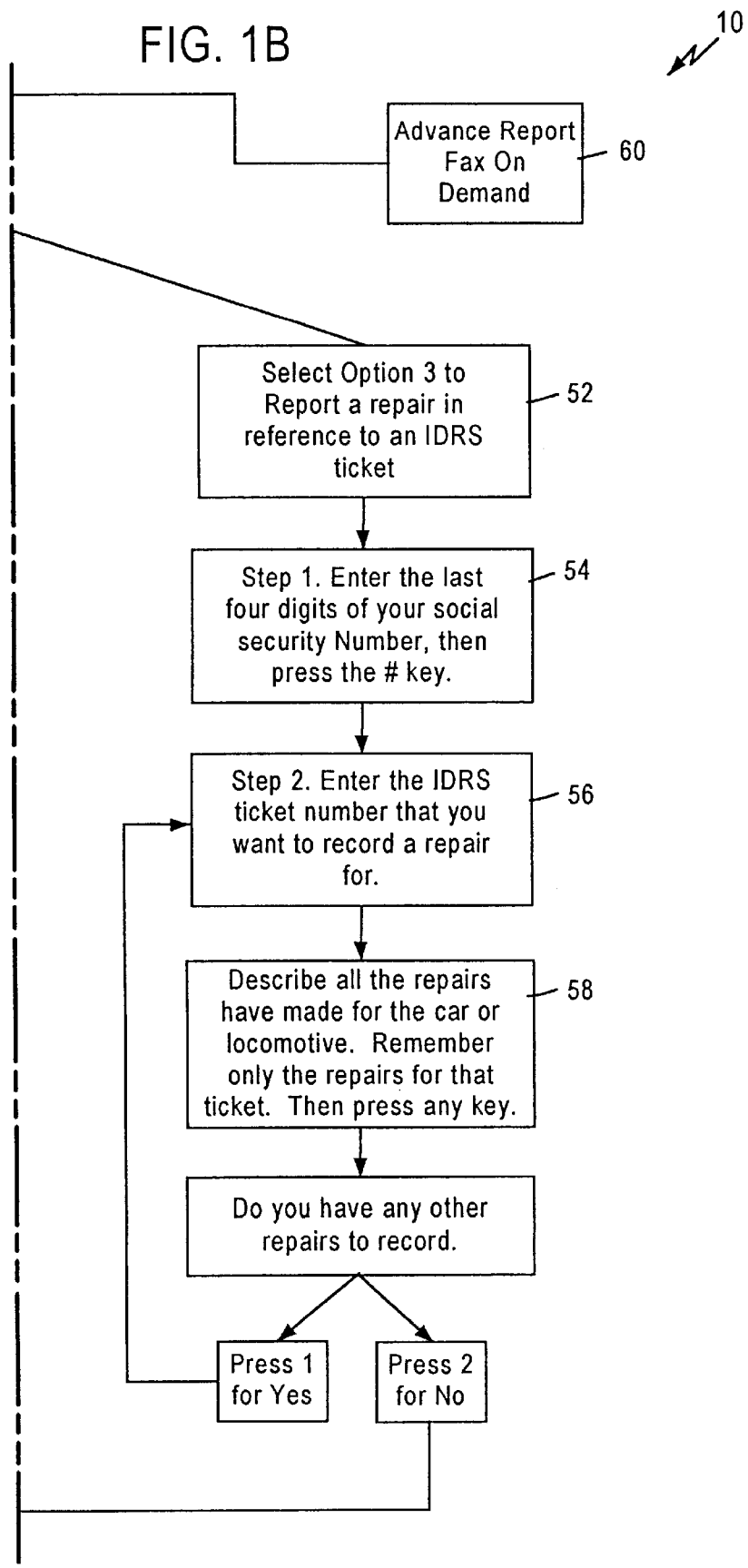

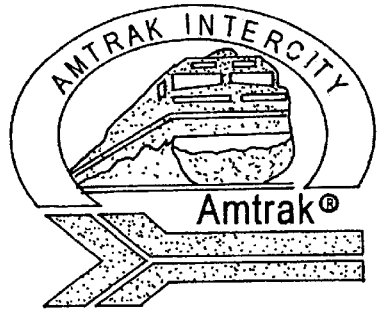 
Interactive Defect Relay System
This fax is to inform you that there is a trouble ticket for the
Train and the unit below
For further information call immediately
1 800-475-9158
| | | |
|---|---|---|
| Ticket: | 33496 | ← 14 |
| Train: | 99 | ← 16 |
| Unit: | 99999 | ← 18 |
| Report Date: | 11/23/98 | ← 20 |
| Report Time: | 13 : 36 | ← 22 |
12
FIG. 2

COMPUTER BASED INTERACTIVE DEFECT REPORTING SYSTEM FOR THE PAPERLESS REPORTING OF PROBLEMS IN A VEHICLE FORMING PART OF A FLEET

TECHNICAL FIELD

The present invention relates generally to systems used for reporting product defects to maintenance personnel and tracking product repairs. More particularly, the invention relates to a paperless system for handling enroute equipment problems and repairs, especially in connection with railway locomotives and cars.

BACKGROUND ART

Railway trains consist of one or more locomotives and cars that periodically experience one or more equipment problems while enroute to a destination. For example, on a passenger train, it would not be uncommon for a dining car to have a oven door that is hard to keep closed; a sleeper car in which a bathroom faucet is leaky, or a room in which a light is burned out. In the past, on-board crew personnel identified such problems by completing a written report which was kept permanently in the car and eventually examined (if not otherwise lost or misplaced) by a repairman at a downline maintenance facility when the train reached its final destination. The lengthy reporting process required on-board personnel to spend a considerable amount of time in writing the report, which included providing car ID information, a description and location of the problem, employee information of on-board personnel supplying the written report, etc. Apart from the time factor, report illegibility was also a problem. These written reports necessitated problems for down-line maintenance personnel as well. In addition to attempting to interpret what were often illegible reports, the maintenance personnel had to prepare written reports as well, describing the type of repair made. Often, the problems identified in the on-board personnel generated reports could be acted upon by maintenance personnel until after the locomotive or car departed from the location of the maintenance facility. This necessitated a time intensive search for the locomotive or car in order to identify the next downline maintenance facility at which the repair could be made. The problem of identifying a next-in-line facility was further exacerbated if the locomotive or car was re-assigned to a different train.

It is accordingly one object of the present invention to handle enroute equipment problems and repairs in a paperless process.

Another object of the invention is to enable on-board personnel to report equipment problems using a cellular phone, railphone or regular telephone.

Another object is to enable on-board personnel to describe the problem in their own words in as much detail as warranted without completion of any paperwork.

Still another object is to enable on-board personnel reporting a particular problem to subsequently follow the progress of repair.

Still another object is to enable mechanics to have immediate access to reported problems so that the mechanics can prepare for problems on a train well in advance of arrival.

Still another object is to enable mechanics to call in the repair and describe in detail what was done to fix the problem without necessitating the preparation of a written report by the mechanic.

Yet a further object is to provide an interactive defect reporting system in which the system updates a nationwide master system which keeps track of all trains so that anyone who has access to the master system can identify reported equipment problems for an inbound train or unit.

A further object is to enable the interactive defect reporting system to update itself by accessing current information from the master system in order to identify next-in-line repair facilities to which an inbound train having an unrepaired equipment problem is travelling to.

Yet a further object is to provide an interactive defect reporting system capable of updating repair codes used in the master system so equipment problem histories can be easily generated.

SUMMARY OF THE INVENTION

The present invention concerns an interactive defect reporting system for handling enroute equipment problems and repairs in a streamlined paperless process. The system enables on-board train personnel to report equipment problems using a cellular phone, railphone or a regular telephone. After calling the system, the on-board personnel describes the problem in their own words in as much detail as necessary without generating any paperwork. The interactive defect reporting system then assigns a unique 'Trouble Ticket' identification number to the report and this same number is used with respect to all subsequent repairs.

In the preferred embodiment of this system, the Trouble Tickets are immediately available to all downline maintenance facilities such as by facsimile. Preferably, as soon as a Trouble Ticket is generated as a result of a reported equipment problem, a facsimile transmission is automatically generated which identifies that a Trouble Ticket has just been generated for a particular train and unit (i.e., locomotive or car) being identified. The date and time of the report is included with the-faxed information as well as the ticket number and a toll-free or other number that a mechanic or other interested user may contact to obtain information. A mechanic in a downline maintenance facility can immediately listen to the Trouble Ticket and can therefore prepare for problems on the train well in advance of its arrival.

Once a problem is fixed, in whole or in part, the mechanic may call in the repair and describe in detail what was done to fix the problem. The mechanic also determines whether the reported problem is in fact a problem requiring repair. On-board personnel may listen to the repairs or request a fax copy of the Trouble Ticket which the interactive defect reporting system of the present invention sends both immediately and automatically. In this manner, most problems may be fixed within twenty-four hours of the initial report.

The interactive defect reporting system of the present invention is preferably designed to interface with an existing nationwide computerized control system utilized by the assignee of the present invention. This system is known as ARROW/OMS which is utilized to contain all information with respect to all trains and units in the assignee's inventory. The master system also includes a file of OMS repair codes. The interactive defect reporting system of the present invention is preferably linked to update the ARROW/OMS master system so that everyone who has access to the ARROW system can also access the Trouble Ticket numbers for any train or unit. The interactive defect reporting system of the invention preferably also updates the OMS repair codes so that equipment problem histories can be easily generated.

A further feature of the interactive defect reporting system of the present invention is the capability of enabling users of the system to receive written descriptions of the problem reports as well as the repair reports on a Trouble Ticket specific basis. Accordingly, a feature of this invention is the ability of a transcription clerk to listen to the voice message problem report or the repair report, respectively generated by on-board personnel or the mechanic, to enable transcription of the verbal report into a computer stored text message.

Still another feature of the present invention involves the capability of accessing advanced reporting features of the interactive defect reporting system to enable users to obtain very detailed information concerning equipment problems and repairs including, but not limited to:

tickets without responses;

equipment histories by type;

train histories;

facility repair histories;

tickets reported by a specific crew member; and tickets repaired by a specific mechanic.

Still other objects and advantages of the present invention will become readily apparent to those skilled in this art from the following detailed description, wherein only the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF DRAWINGS

FIG. 1 is a flow diagram of menu options and events occurring once the interactive defect reporting system of the invention is accessed by telephone;

FIG. 2 is a representative preliminary report automatically generated by the system of the invention for immediate faxing of the existence of a reported problem to a downline repair facility;

BEST MODE FOR CARRYING OUT THE INVENTION

Figure 3:
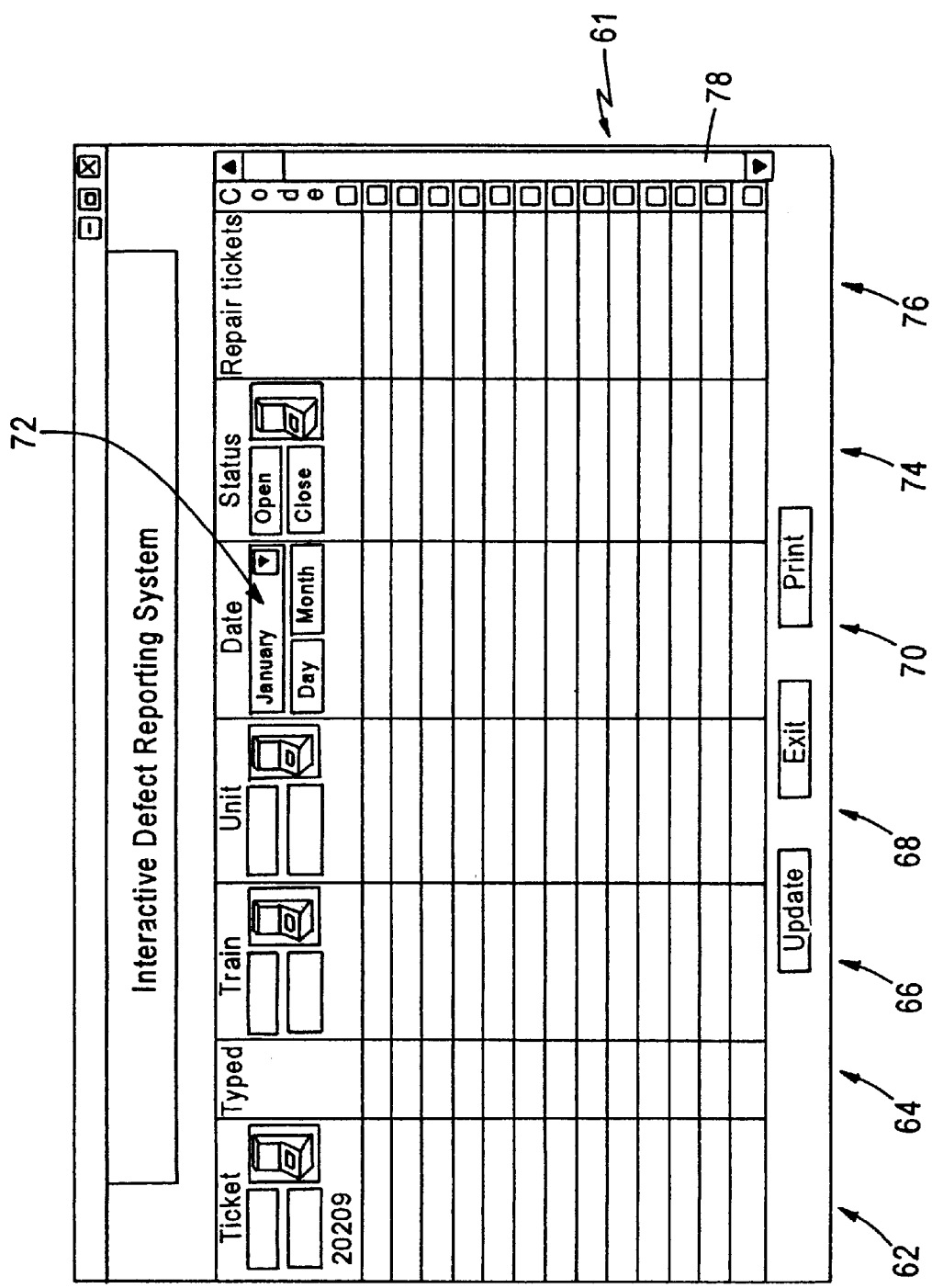
FIG. 3 is an illustration of a computer screen visualized by a transcription clerk in order to transcribe reported problems and repairs.

The interactive defect reporting system, generally designated with reference numeral 10 in FIG. 1, is a computerized system for handling enroute equipment problems and repairs. This system 10, also hereinafter identified as "IDRS", is designed as a streamlined paperless process that replaces previously used written paper-based systems that required on-board personnel and maintenance personnel to generate hand-written reports.

IDRS has several significant features:

1. On-board personnel report equipment problems using a cellular phone, a railway phone or a regular phone. After calling the system, on-board personnel describes one or more problems in their own words in as much detail as necessary—all without any paperwork. IDRS automatically assigns a unique Trouble Ticket number to the report and all subsequent repairs.

2. Mechanics listen to the Trouble Tickets or have transcribed copies faxed to their facility.

3. Trouble Tickets are immediately available to all downline maintenance facilities. For example, a Trouble Ticket having the information 12 contained in FIG. 2 can be generated by IDRS immediately upon termination of an equipment problem phone call by on-board personnel. The preliminary report 12 automatically generates the ticket number 14, the train 16 experiencing the problem, the car 18 on the train experiencing the problem, the report date 20 and report time 22. Mechanics can immediately access the telephonic message report and prepare for problems on a train well in advance of its arrival. Alternatively, the mechanics can await transcription of the report into a written text message that can be faxed on demand to the mechanic or other responsible or interested railway personnel.

4. Once a problem is fixed, the mechanics may call in the repair and describe in detail what was done to fix the problem.

5. On-board personnel may listen to the repairs or request a fax copy of the Trouble Ticket which is sent immediately by the IDRS. With this invention, most problems have the capability of being fixed within twenty-four hours of the initial report.

6. IDRS updates the ARROW/OMS system automatically so everyone who has access to ARROW can view the Trouble Ticket numbers for any train or unit. IDRS also automatically updates OMS repair codes so equipment problem histories can be easily generated, as discussed more fully below.

As used in this specification, a Trouble Ticket is intended to mean a unique number which is automatically assigned by IDRS to track the problems reported for each car and locomotive and their subsequent repairs. On-board personnel preferably report all problems they experience for a particular car or locomotive on one Trouble Ticket. It is a highly preferred feature that only one car or locomotive be reported per ticket in order to facilitate proper repairs and tracking of completed repairs. Each ticket also identifies the individual who reported the problem as well as the individual who repaired the problems.

Reporting Problems—On-Board Personnel

Problems are typically reported by on-board crew members utilizing a cellular phone, Railphone, or a regular telephone system. On-board crew members as well as all users of IDRS can access the system by dialing a well publicized toll-free number as depicted, for example, in IDRS access block 24 of FIG. 1.

Therefore, to report problems, on-board personnel would dial the publicized access number and would then immediately hear a main menu providing three or more options. The first option 26 is "If you are an on-board crew member reporting a problem press 1." The on-board crew member would press 1 on the telephone keypad to access the problem reporting section 28 of IDRS.

When accessing the problem reporting section 28, IDRS requests the user to supply their last four digits of the user's social security number (block 30). This information will assist the mechanic or mechanics repairing the problem in contacting the on-board crew member in the event they require additional information. This information also enables the on-board crew member to obtain a copy of all Trouble Tickets they report, as described in further detail below. If the caller is initiating their first call into the system, IDRS also requests the crew member's name and crew base location.

Following receipt of the personal information, IDRS then prompts the caller to "Please enter the unit number for the car or locomotive that you are reporting." This information 32 is entered with the telephone keypad and the entry may be completed by pressing the # sign as is conventional. In the preferred embodiment, it is important to enter the unit number and not the consist number. For railway cars, unit numbers are typically located above the car body end doors. After receipt of the unit number, IDRS reads back the unit number and advises, for confirmation purposes, as to what type of car or locomotive is being reported, e.g., "Superliner Coach" or "P-42 Locomotive". If the information is incorrect, the user may follow the prompts to re-enter this information. IDRS then requests the train number 34. Once this information is obtained, IDRS repeats the train number and, for confirmation purposes, expresses the train number, e.g., "Train Number 58—the city of New Orleans". If the information is incorrect, the user follows the prompts to re-enter this information.

Once IDRS has identified the caller 30, the train 34 and which car or locomotive 32 a problem is being reported for, the IDRS prompts the caller to describe the problem 36 being experienced. In the preferred embodiment, the on-board crew member has up to three minutes (or other predetermined time interval) to describe the problem or problems for each car or locomotive. Preferably, the on-board crew member can report as many problems as exists with respect to a single piece of equipment within the context of a single Trouble Ticket. However, in the event one or more on-board crew members are reporting problems in different cars or locomotives, the caller will preferably use a separate Trouble Ticket for each car or locomotive being reported.

Upon completion of description of all problems 36 associated with a particular car or locomotive 32, the user preferably presses any key at which time IDRS provides the following prompt: "Do you have any other problems to report?". If the answer is NO, IDRS provides the caller with the Trouble Ticket number for the problem(s) reported. If there are no further equipment problems to be reported, the user terminates the call by hanging up. Otherwise, the user is prompted to return to step 2 and enter the car or locomotive number of the next car being reported in order to provide the information requested in steps 2–4, i.e., information blocks 32–36.

Once the user hangs up, IDRS provides the Trouble Ticket to the next or all downline maintenance facilities immediately. The Trouble Ticket has the form 12 set forth in FIG. 2.

Generally, the on-board crew member reporting a problem can expect a response within twenty-four hours after the train arrives at its final destination. The user may contact IDRS and listen to the repair response, described more fully below, or have a copy faxed immediately via the Fax on Demand feature described below. To listen to repairs made to equipment reported, the user contacts IDRS and selects Option 2 (block 38) to check on ticket information. IDRS will prompt the caller to listen to the ticket information or have the ticket information faxed immediately.

If the caller elects to listen to ticket information (block 40), IDRS prompts the caller to enter the ticket number (block 42) assigned by IDRS to a particular problem(s) and car. In this manner, IDRS retrieves the ticket information from storage and plays both the defect that was reported and the repair that was made. IDRS is also capable of providing the caller with information as to who repaired the problem, the date the repairs were made and where the repairs were performed.

In the alternative, the aforementioned ticket information may be faxed to the caller (see block 44). IDRS prompts the caller to provide their fax machine number 46 and then automatically faxes the above-identified information typically within five minutes.

Utilizing advanced reporting features discussed more fully below, the caller can also request a copy of all Trouble Tickets the caller may have reported, or tickets reported for a specific car, locomotive or train.

Reporting Repairs—(Mechanics)

As mentioned above and with reference to FIG. 2, a facsimile message 12 is generated immediately upon receipt of a problem reported by a crew member to IDRS under Option 1. The facsimile message 12 may have the form and contents set forth in FIG. 2. By interfacing with the ARROW system, IDRS is capable of identifying the next downline repair facility, or all downline facilities, for purposes of faxing the problem notification of FIG. 2 to an appropriate mechanic.

The mechanic accesses IDRS by dialing the general access number 24 set forth in FIG. 1 and then selecting the appropriate prompt from the menu. In this case, the mechanic would select Option 2 (block 38) to listen to ticket information 40 or have the information sent via facsimile 44. To be effective, the information sent via facsimile 44 is preferably available once the recorded information has been transcribed in the manner described below. Otherwise, by selecting Option 1 under the retrieve ticket information menu, the user may listen to the problems recorded either specifically by Trouble Ticket number, unit number or train number. In this manner, appropriate repair personnel can obtain information about problems on all trains enroute to their facility.

From the above, it will be appreciated that IDRS provides a number of methods for repair personnel to obtain reported ticket numbers and the problems they represent. Whenever a problem report is called in, as discussed above, IDRS automatically faxes an alert sheet having the form depicted in FIG. 2 to the downline facility. The alert sheet 12 states the ticket number, unit reported, train on which that unit is travelling and the date and time the problem was reported.

This information is train specific so that mechanics will not receive these notifications if the train is not travelling to their facility. The mechanic can use these alert sheets 12 to access specific tickets or obtain Trouble Ticket information by unit, train or by destination facility by calling IDRS and requesting information as discussed in more detail below.

By selecting Option 2 as described above in connection with FIG. 1, IDRS plays the "retrieve ticket information" menu 48 and prompts the user to either listen to ticket information 40 or have the information 44 faxed to the downline maintenance facility. To listen to ticket information, as mentioned above, the user may choose Option 1 and IDRS then prompts the user with a short series of choices that allows the user to listen to a specific ticket, all tickets for car or locomotive, all tickets reported for a specific train, or all tickets for all trains that are arriving at the mechanic's facility.

If the mechanic already has the ticket number and wants to listen to the problem reported, IDRS prompts the mechanic to "Enter the ticket number, then press the # key." The mechanic then enters the ticket number they wish to hear, presses the # key and IDRS then plays the reported problem along with car or locomotive number, and the date and time the problem was reported.

If the mechanic wishes to listen to all tickets for a car or locomotive, IDRS prompts the mechanic to "Enter the car or locomotive number, then press the # key." The mechanic then enters this information, presses the # key, and IDRS then plays a list of all of the ticket numbers for the unit chosen. The mechanic may listen to a report for a specific ticket while his list of ticket numbers is being played by pressing the * key once the mechanic hears the number of the desired ticket.

In addition to enabling the user to listen to all tickets for a car or locomotive, IDRS also allows the user to obtain all reports for a specific train. If this information is requested, IDRS prompts the user to "Enter the train number, then press the # key." After entering the train number, IDRS plays a list of all open Trouble Tickets for this train. As with tickets for a specific unit, the user may press the * key to hear the full IDRS report after hearing the number of the ticket to be selected.

IDRS also advantageously enables the user to listen to all tickets 50 for all trains coming to a particular maintenance facility. IDRS requests the user to enter the facility code. In most cases, this code is a three letter ARROW city code for the city in which the facility is located, such as representatively set forth in Table 1 below.

TABLE 1

| Maintenance Facility Location | City Code | Telephone Keys |
| --- | --- | --- |
| Chicago | CHI | 244 |
| Denver | DEN | 336 |
| Los Angeles | LAX | 529 |
| Miami | MIA | 642 |
| New Orleans | NOL | 665 |
| New York | NYP | 796 |
| Oakland | OKJ | 655 |
| San Antonio | SAS | 727 |
| Seattle | SEA | 732 |
| Washington, D.C. | WAS | 927 |

In addition to providing the actual recorded problem, IDRS can also send the same information to the user's fax machine. This feature, called Fax on Demand, provides a printed copy (when available) of all IDRS information requested by the user. To retrieve IDRS information using Fax on Demand, the user selects Option 2 (block 44) from the Retrieve Ticket Information Menu 48 as depicted in FIG. 1. After selecting the Fax on Demand Option 2, the user can select the information they want to have faxed in the same manner as if they were going to listen to the information, as described in detail above. Once the user makes their selection, IDRS prompts the user for their fax number 46. IDRS will then typically fax the requested information within five minutes. In the event that requested information is not transcribed and therefore unavailable in written form for faxing, IDRS has the capability of faxing the user a message which informs the user to contact IDRS and listen to the recorded information in the manner described above.

Irrespective of whether the user chooses to listen to the recorded problem message 40, or receive a written transcription 44 thereof, in either option the information is provided to the user in the exact words of the crew member that reported the problem. This type of detailed, accurate information should significantly aid the mechanic in their diagnosis and repair of the problem. In addition, as mentioned above, the mechanic can obtain identification of the crew member who reported the problem in the event that further information is necessary by contacting the crew member.

Once the mechanic has retrieved the IDRS ticket information and has taken the action to correct the problem, IDRS advantageously enables the mechanic to contact IDRS at the general number 24 to report the repair. This information enables IDRS to close the ticket and provide a copy to the crew member that reported the problem, as well as other interested IDRS users.

To report the repair, the mechanic contacts IDRS at the general number 24 and selects Option 3 (block 52) from the main menu. IDRS prompts the mechanic for the last four digit of their social security number 54, their name and maintenance facility (only on the mechanic's first call), the ticket number 56, the unit that was repaired and a verbal description 58 of the repair. Preferably, IDRS is designed to allow the mechanic up to three minutes per ticket to describe all repairs made to a particular car. The mechanic's response is available to the on-board crew member that reported the problem. IDRS may be equipped to provide the on-board crew member with an automatic fax copy of the repair report once the report has been transcribed.

Once the mechanic finishes describing the repair, any key may be pressed to enable the mechanic to describe repairs made with respect to other Trouble Tickets and to repeat the process for reporting repairs until no other ticketed repairs exist. The mechanic may then hang up.

Advanced Options

Advanced reporting options are available through IDRS. Advanced options include a number of reports that are available through Fax on Demand. To access the advanced options section of IDRS, Option 4 (block 60) is selected from the main menu.

Once Option 4 has been selected, the advanced reporting feature of IDRS allows the user to obtain very detailed information about equipment problems and repairs including:

tickets without responses;

equipment histories by type of car (e.g., all Viewliners);

train histories;

facility repair histories;

tickets reported by a specific crew member;

tickets repaired by a specific mechanic.

Each available report preferably has a report number which the user must select to have that report faxed. Table 2 below contains the report numbers of the available reports to IDRS users.

second column identifies the unit number within a specific train. The third column identifies the date the problem was

TABLE 2

IDRS Advanced Reporting Options
Document Index                      Page 1 of 1

| Report | Report Code | Report | Report Code |
|---|---|---|---|
| Tickets Without Responses (facility) | | Equipment History per Equipment Type | |
| last 30 days | 1171 | last 30 days | 1271 |
| last 90 days | 1172 | last 90 days | 1272 |
| past half year (182 days) | 1173 | past half year (182 days) | 1273 |
| past year (365 days) | 1174 | past year (365 days) | 1274 |
| past 2 years (730 days) | 1175 | past 2 years (730 days) | 1275 |
| Train History | | Unit History | |
| last 30 days | 1371 | last 30 days | 1471 |
| last 90 days | 1372 | last 90 days | 1472 |
| past half year (182 days) | 1373 | past half year (182 days) | 1473 |
| past year (365 days) | 1374 | past year (355 days) | 1474 |
| past 2 years (730 days) | 1375 | past 2 years (730 days) | 1475 |
| Tickets Reported By Crew Member | | Tickets Repaired By Mechanic | |
| last 30 days | 1671 | last 30 days | 1771 |
| last 90 days | 1672 | last 90 days | 1772 |
| past half year (182 days) | 1673 | past half year (182 days) | 1773 |
| past year (365 days) | 1674 | past year (365 days) | 1774 |
| past 2 years (730 days) | 1675 | past 2 years (730 days) | 1775 |

Facility Repair History    ( * REPORT NOT YET AVAILABLE * )
In addition to Report Code, you will be voice prompted to enter
facility code, train, unit, equipment type, or social security numbers
where appropriate.
Up to 5 documents may be requested per telephone call to IDRS at 1-800-475-9158.
*********************************************************************
Equipment Type Codes (for use with Equipment History Reports)

| Code | Type or General Type | ***** | Code | Type or General Type |
|---|---|---|---|---|
| 5000 | Superliner I (all types) | | 7000 | Horizons |
| 5001 | Superliner I Sleepers | | 7001 | Food Service (Horizon) |
| 5002 | Superliner I Lounge | | 7002 | Food Service HCDP (Horizon) |
| 5003 | Superliner I Coach | | 7003 | Coach (Horizon) |
| 5004 | Superliner I Deluxe Sleeper | | 7004 | Coach HDCP (Horizon) |
| 5005 | Superliner I Snack Coach | | 8000 | Viewliner (all types) |
| 5006 | Superliner I Diner | | 8001 | Viewliner Sleeper |
| 5007 | Superliner I Coach/Bag | | 8002 | Viewliner Diner |
| 5008 | Superliner I Trans Dorm | | 9000 | Amfleet |
| 6000 | Locomotives | | 9001 | Cab Car (Amfleet) |
| 6001 | GP40PH | | 9002 | Cab Car Conference (Amfleet) |
| 6002 | F40PH | | 9003 | Cab Car Regular (Amfleet) |
| 6003 | P32-8 | | 9004 | Amcafe |
| 6004 | P40 | | 9005 | AmCafe II |
| | | | 9006 | AmCoach |
| | | | 9007 | AmCoach II |
| | | | 9008 | AmLounge |
| | | | 9009 | AmDinette |

To obtain the current catalog of available reports, the user may select Option 1 from the Advanced Options Menu. IDRS will prompt the user to enter the number of the fax machine where the user requests the information to be sent. IDRS is also capable to sending the catalog of available reports (Table 2) to the user by facsimile. Once the user receives the catalog of current reports, the user can then choose a report to be faxed by first selecting Option 2 from the Advanced Reporting Options Menu. IDRS will prompt the user to enter the report number they wish, followed by the # sign. IDRS then prompts the user to enter the fax number where the user wishes the report to be sent. Typically, IDRS will send the requested report within five minutes.

Table 3 below is a representative advanced report which identifies tickets reported by train number and unit number. The first column identifies the Trouble Ticket number. The reported. The fourth column identifies the number of days since the problem was reported and the fifth column represents the status of each ticket.

TABLE 3

Open tickets for Chicago

| Ticket | Unit | Date | Days open | Status |
|---|---|---|---|---|
| | | Train 3 | | |
| 28807 | 34029 | 08/08/98 | 107 | U |
| 29682 | 33002 | 08/25/98 | 90 | U |
| 32922 | 32083 | 11/10/98 | 13 | U |
| 33222 | 1429 | 11/17/98 | 6 | U |
| 33289 | 96 | 11/19/98 | 4 | O |
| 33290 | 82 | 11/19/98 | 4 | O |

TABLE 3-continued

Open tickets for Chicago

| Ticket | Unit | Date | Days open | Status |
|---|---|---|---|---|
| | | Train 4 | | |
| 33208 | 32105 | 11/17/98 | 6 | O |
| | | Train 5 | | |
| 30754 | 32068 | 09/19/98 | 65 | U |
| 32353 | 39019 | 10/27/98 | 27 | U |
| 32964 | 71149 | 11/11/98 | 12 | O |
| 33267 | 34065 | 11/19/98 | 4 | O |
| 33325 | 1251 | 11/20/98 | 3 | U |
| 33326 | 1251 | 11/20/98 | 3 | O |
| | | Train 6 | | |
| 30887 | 32068 | 09/22/98 | 62 | U |
| 30888 | 32068 | 09/22/98 | 62 | U |
| 30912 | 32068 | 09/22/98 | 62 | U |
| 32490 | 39019 | 10/30/98 | 24 | U |
| 33046 | 38066 | 11/13/98 | 10 | U |
| 33047 | 33016 | 11/13/98 | 10 | U |

Transcription of Reported Problems and Repairs

As discussed above, an important feature of IDRS resides in the ability to transcribe problem reports and repair tickets. Transcription of the problem reports and the repair tickets helps the fleet provider maintain a more reliable fleet on the road. Since the IDRS is preferably a computer based system (e.g., utilizing an OS/2 operating system in combination with a WINDOWS NT platform), the transcription clerk or clerks will initially access the IDRS transcription program by double clicking an appropriate icon.

Upon accessing the transcription program, the clerk will initially see a first screen 61 such as depicted in FIG. 3. The first lefthand column 62 is entitled "Ticket" and the second column 64 bearing the legend "Typed" advises the transcription clerk whether the associated ticket number in the first column has been transcribed. If the column has a YES in it, then a problem report has already been transcribed. If the column has a NO in it, then a problem report needs to be transcribed. Preferably, but not necessarily, this information can also be provided by highlighting the ticket number in a color different from ticket numbers that have already been transcribed.

The third and fourth columns 66 and 68 are self explanatory. They provide the viewer with train and car identification information.

The date column 70 indicates the date a particular Trouble Ticket report was generated. In accordance with a unique feature of the invention, the pull-down bar 72 in the date column enables the transcription clerk or user to view tickets in other months.

The status column 74 advises whether the ticket is open (O) or updated (U). Closed tickets preferably are not depicted in this screen 61.

The ticket repair column 76 preferably has one of three entries. One entry is NO indicating that no mechanic has responded to this ticket and that the ticket is in a state of investigation. It is important to note that in IDRS, a problem report is not a defect until a mechanic determines whether a defect really exists. The second entry in this field is YES meaning that the repair has been typed and is awaiting investigation to determine why the ticket has not been closed. If the ticket has been completed and all repairs to the problem report have been made, the ticket will disappear from this screen. It is also possible that a condition may exist wherein all repairs have not been performed. In this case, the ticket remains in the updated status (third entry type)

The last column or code column 78 indicates whether the ticket has been OMS coded. This is only active on repairs that have already been made.

Figure 4:
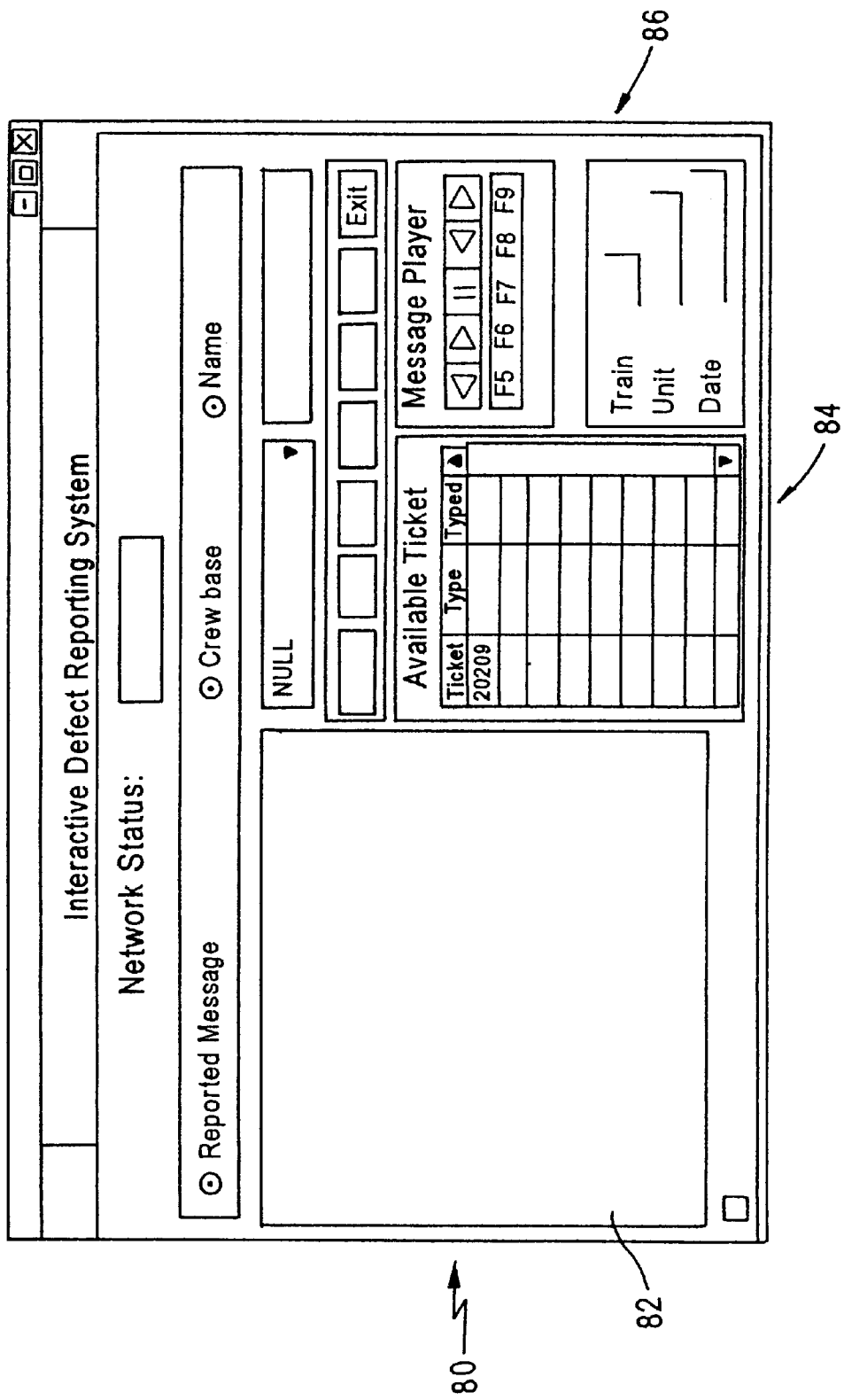
FIG. 4 is an illustration of a computer screen visualized by a transcription clerk after double clicking a ticket number requiring transcription from the screen depicted in FIG. 3.

FIG. 4 is an illustration of a screen 80 visualized by the transcription clerk after double clicking a ticket number 62 requiring transcription from the screen 61 depicted in FIG. 3. On the lefthand side of the screen 80 is an open area 82 to be used for the actual typing of exactly what is said by the on-board crew member rendering the problem report. The area "Available Tickets" 84 indicates the repair tickets requiring transcription. The three columns inside the Available Tickets area are respectively the ticket number, the type of ticket it is, and whether the ticket has been typed.

To activate the "Message Player" 86 on the far right of the screen 80, the transcription clerk double clicks the ticket number appearing in the Available Tickets area 84. Preferably, the ticket is highlight in red or a different color to indicate that it requires transcription.

The Message Player section 86 includes five buttons typical to that of a regular tape player. By double clicking one of these buttons, the transcription clerk can either listen to the on-board crew member describing a defect or, if the mechanic has already rendered a verbal repair report, to the mechanic that repaired the defect. The first button (which may also be actuated by pressing the F5 key located below this bottom on the transcription clerk's keyboard) enables the clerk to back up the message in order to hear it from the beginning. The second button (F6) is the play button. This plays the message beginning from where the clerk has previously stopped the message. The pause button (F7) will pause the message to enable the transcription clerk to catch up while transcribing. The next button (F8) allows the transcription clerk to rewind the last few seconds of the message just played. This button enables the transcription clerk to hear words or phrases that are difficult to understand. The last button is the skip forward button (F9) which enables the transcription clerk to skip forward in the message a few seconds. This allows the transcription clerk to hear parts of a message instead of listening to the entire message.

After the transcription clerk has typed the problem report, the clerk clicks the Done button. In the available ticket area, the identifier in the Type column will change from NO to YES indicating that the reported message has been typed. The Exit button enables the transcription clerk to return to the screen 80 of FIG. 3.

Figure 5:
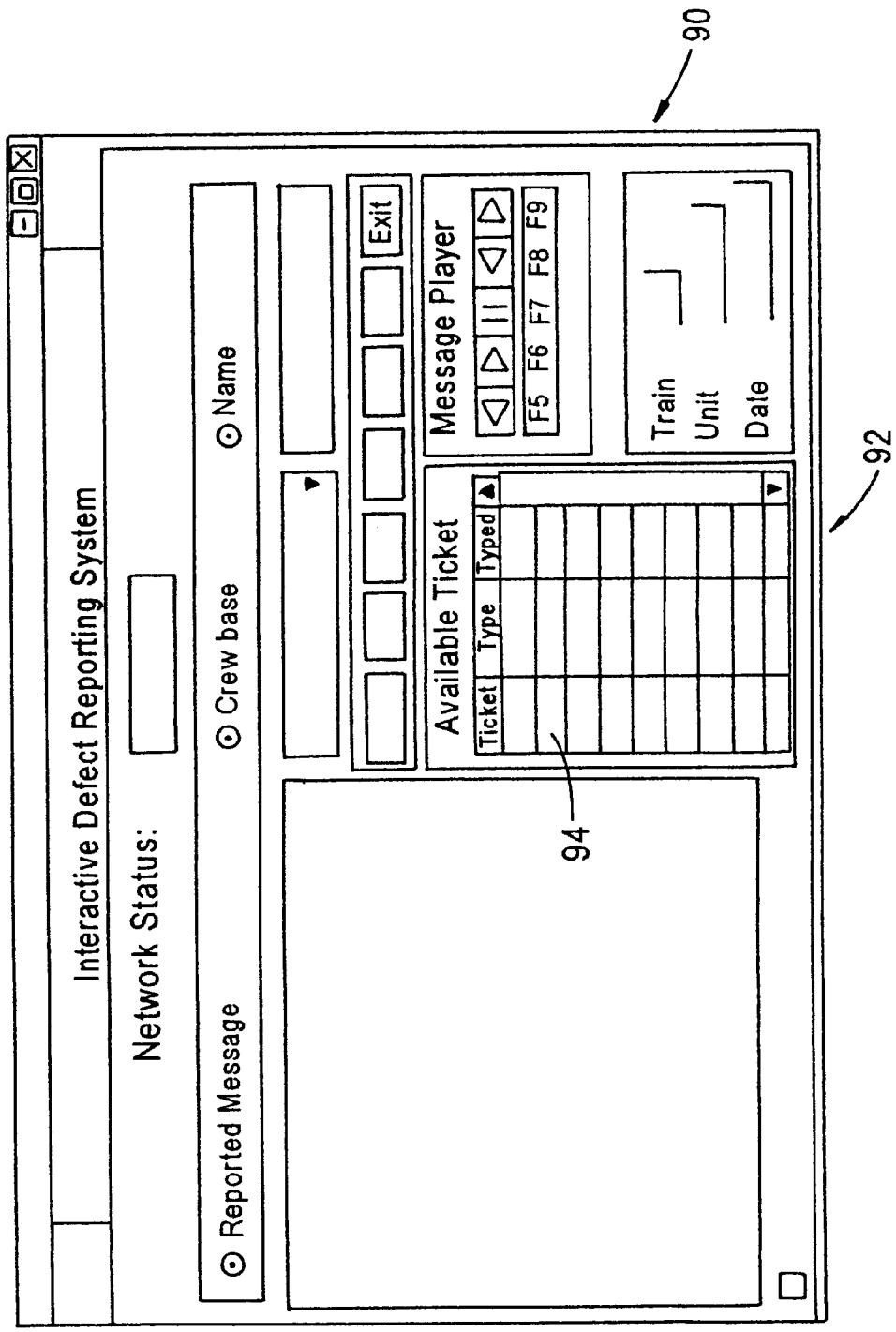
FIG. 5 is a screen accessed by the transcription clerk in order to transcribe a reported repair message.

FIG. 5 is a screen 90 accessed by the transcription clerk in order to transcribe a reported repair message and to code the tickets for the OMS program which monitors maintenance and repairs in the ARROW system.

In the Available Tickets section 92, the second line 94 has the same ticket number as the first line and in the adjacent Type window, the designation has been changed to Repair. The Typed column indicates NO which means that a repair message has been recorded but not transcribed. To transcribe the repair message, the transcription clerk follows the same instructions used to transcribe problem reports as discussed in detail above. The repair recording is accessed by double clicking the ticket number appearing in the second line to activate the Message Player.

Figure 6:
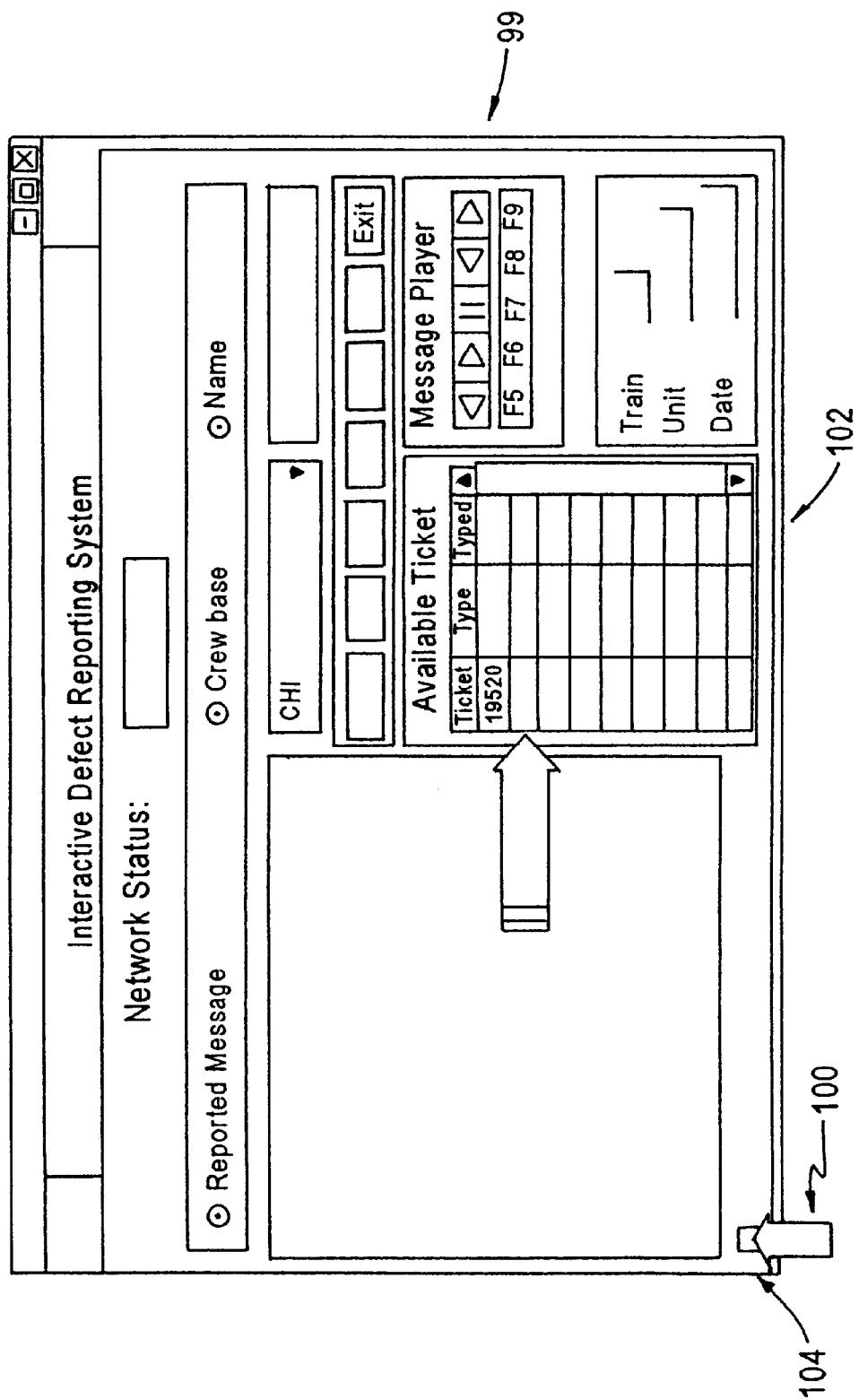
FIG. 6 is an illustration of a screen similar to FIG. 4 when there is more than one repair on a Trouble Ticket.

FIG. 6 is an illustration of a screen 99 similar to FIG. 4 indicating that there may be more than one repair on a ticket. The second line of the Available Tickets area 102 awaits transcription while the third line indicates a repair under the same ticket number (i.e., in the same locomotive or car) that has already been transcribed. FIG. 6 therefore illustrates the occurrence of multiple repairs on one ticket. Each repair must be transcribed in the manner specified above.

The arrow 100 denotes a check box 104 at the bottom of the lefthand side of the screen 99 bearing the legend (not shown in detail) "Check here if nothing was done in the repair section." This box 104 is checked by the transcription clerk if the intent is to leave the ticket in an updated status and it is desired not to close the ticket. In the example of FIG. 6 in which one repair has been transcribed and the other repair has not, the box 100 must have been previously checked by the transcription clerk in order to access the screen of FIG. 6. If the transcription clerk forgets to check box 100 or wishes to close the ticket, as soon as the clerk presses the Exit button, IDRS will automatically close this ticket. However, IDRS will alert the transcription clerk that it is closing the ticket before actual closure.

Figure 7:
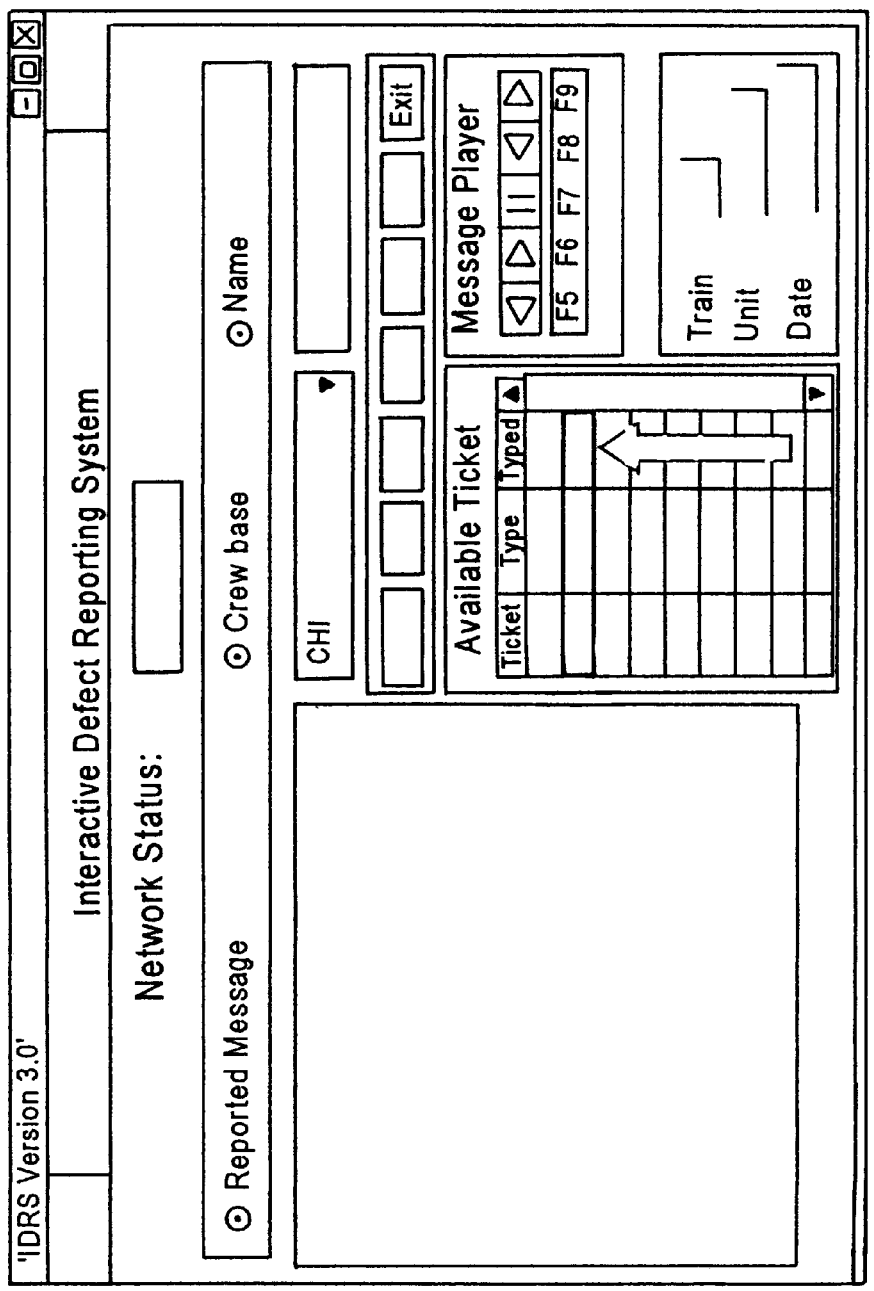
FIG. 7 is an illustration of a screen appearing after the transcription clerk has transcribed all repairs to a ticket and the repairs are now ready to be coded.

FIG. 7 is an illustration of a screen 110 after the transcription clerk has transcribed all repairs to a ticket. At this point, the repairs are ready to code and the Code button is now black to indicate that this button may be actuated in order to access the coding screen 120 depicted in FIG. 8.

In the top lefthand corner of the coding screen 120, there is displayed the ticket number, followed by the train, unit and type. The repair report from FIG. 7 now appears in the top right area of the coding screen 120. In the area in the lefthand side of the screen 120 is a description of the list 122 of codes that must be selected by the transcription clerk. For example, in order to code the repair "Shower Light Repaired" depicted in the reported repair transcription box 124, the transcription clerk would highlight the designation "Electrical" as denoted with arrow 124 since all lights, for example, are coded in "Electrical".

Figure 9:
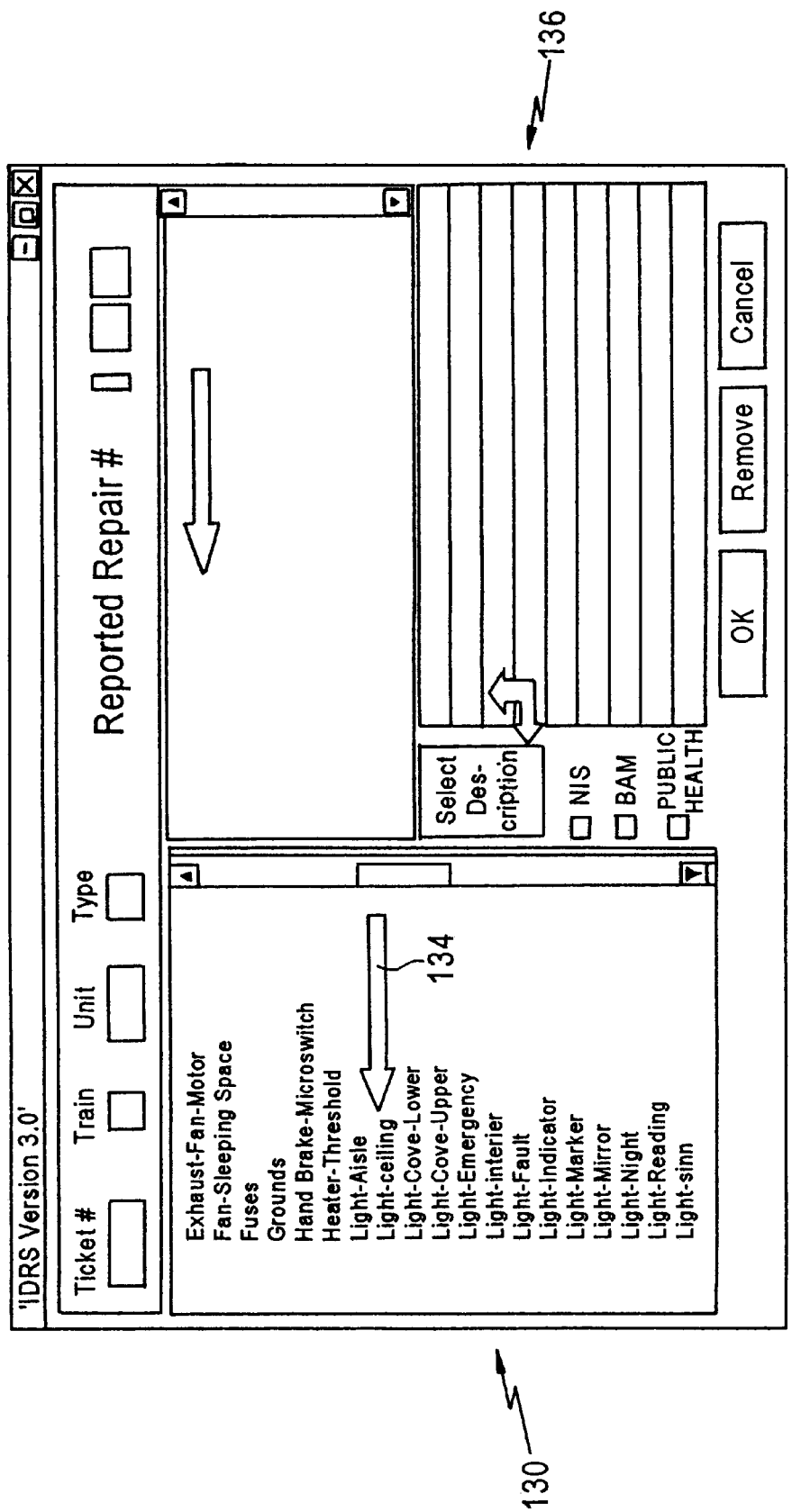
FIG. 9 is an illustration of a second coding screen that appears to provide specific sub-coding information for a particular coded category.

Still with reference to the example being discussed above, with reference now to FIG. 9, the second coding screen 130 under the designation "Electrical" is now displayed with respect to the "Shower Light Repaired" problem and repair. The transcription clerk will highlight the designation "Light-Ceiling" identified by arrow 134. By clicking this designation, the description of the selected defect immediately appears in the "Selected Defect Descriptions" area 136 in the lower righthand corner of the screen 130.

Figure 8:
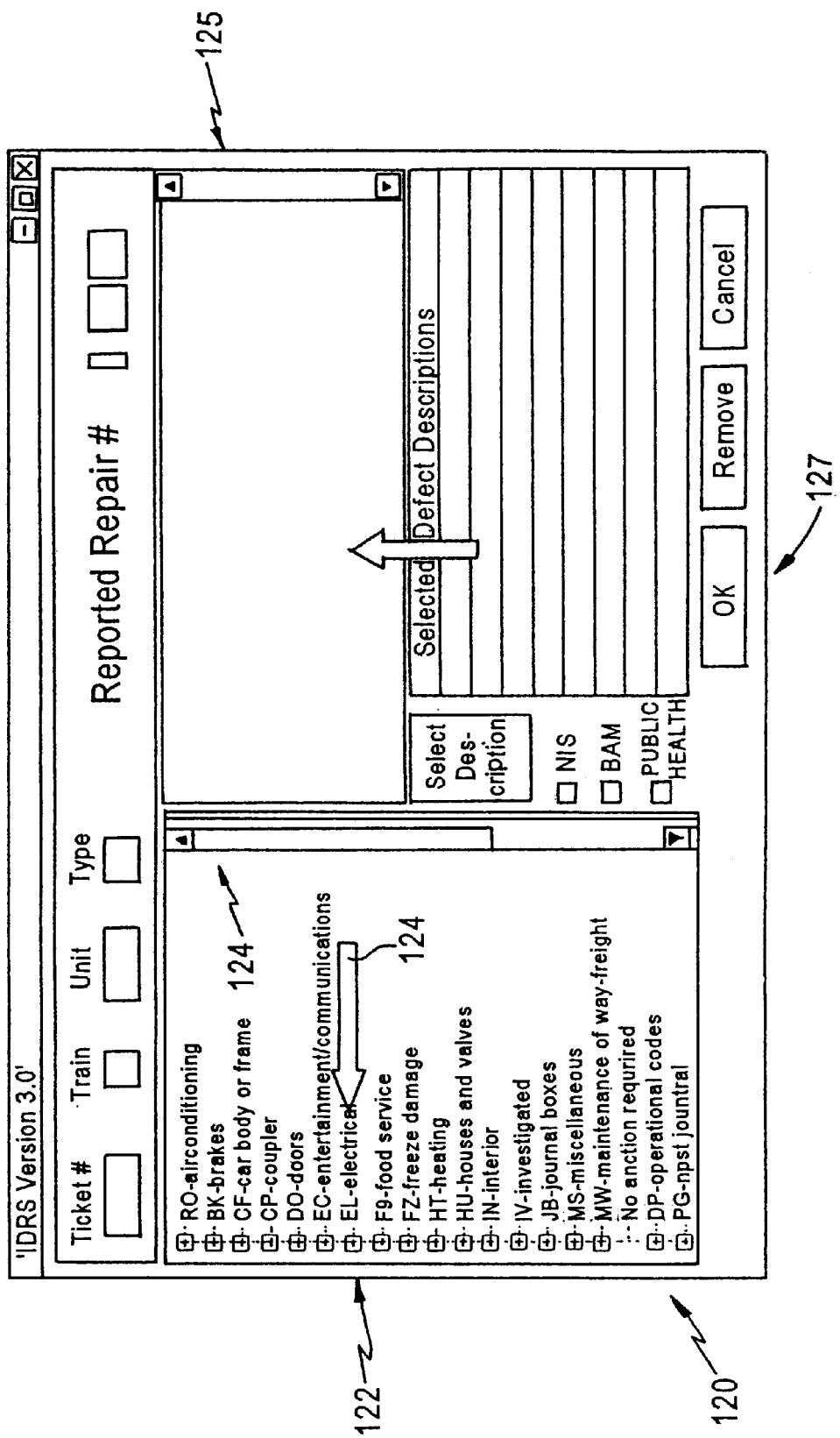
FIG. 8 is an illustration of a screen that is accessed by the transcription clerk upon clicking the coding button of FIG. 7.

The transcription clerk essentially codes by highlighting the specific repairs in sequential order, beginning at the top of the list 125 in FIG. 8, until all repairs have been coded in the manner described above. At that point, the transcription clerk will click the "OK" button 127 and will be returned to FIG. 7. Upon being returned to the screen 110 of FIG. 7, the transcription clerk may close the ticket by clicking the Exit button as mentioned above. To prevent inadvertent ticket closures, any ticket which has not yet been coded will still be highlighted in red. Preferably, the transcription clerk will check these areas to ensure complete transcription before closing the ticket.

The IDRS Browser

Figure 10:
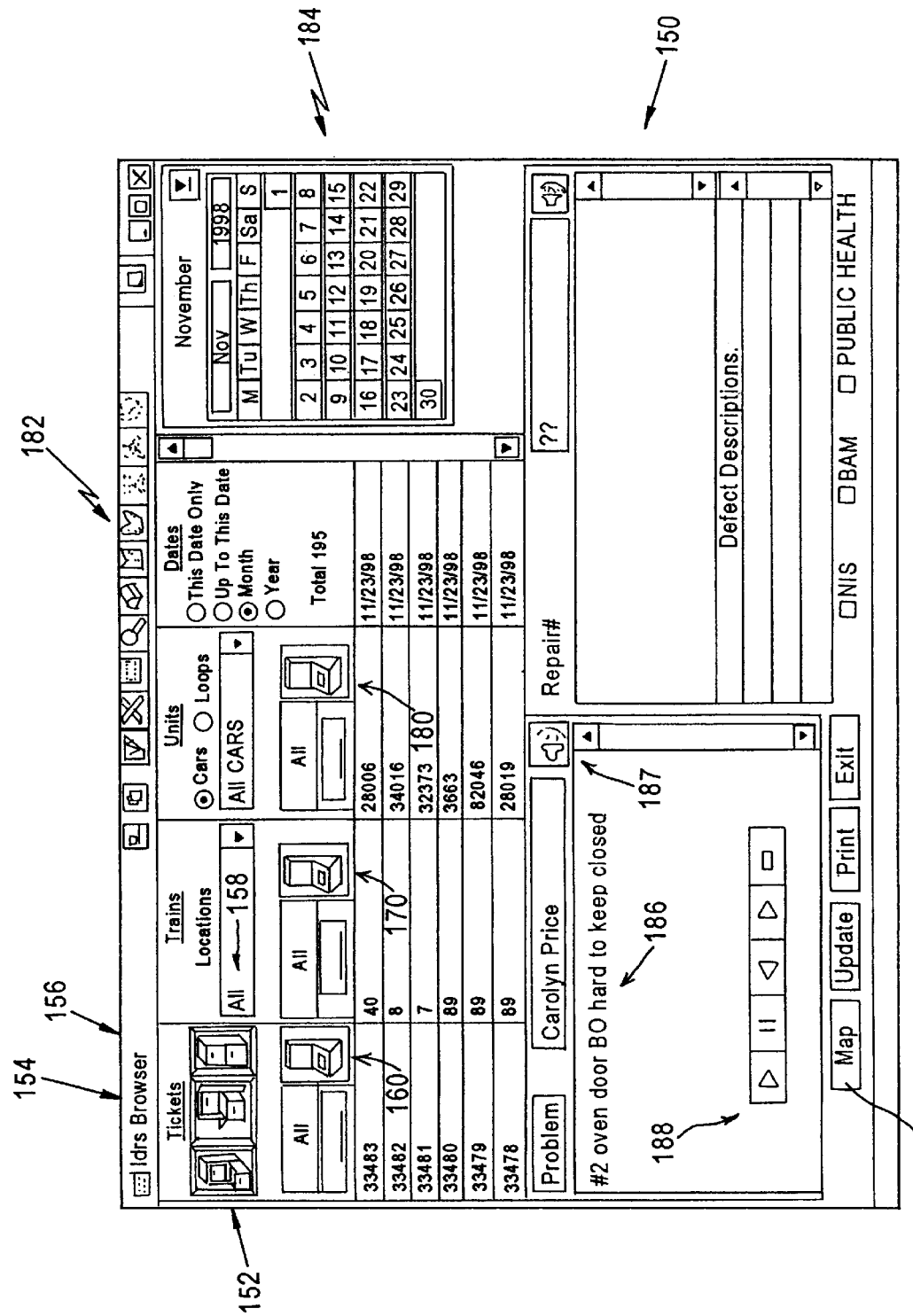
FIG. 10 is a browser screen.

FIG. 10 is an illustration of the main screen 150 of the IDRS browser. In the upper lefthand corner, the open file cabinet 152 indicates that the ticket numbers displayed are open tickets. The second file cabinet 154 with a hand filing a record is the updated ticket file. The third file cabinet 156 with the closed drawers is the closed ticket file. An updated ticket indicates that a repair has been made on a ticket but has not yet been completed. All tickets are filed in one of these drawers 152–156, irrespective of whether they have been transcribed.

The train locations area 158 has a drop down menu of all repair facilities that receive trains. By highlighting one of these repair facility locations, all ticket numbers of trains enroute to that area may be displayed.

Push button 160 allows the user to search for specific ticket numbers. Push button 170 allows the user to browse for ticket numbers associated with a specific train.

Push button 180 allows the user to browse for a specific car or locomotive. Advantageously, this information is cross-referenced.

The dates field 182 allows the user to browse for ticket numbers that came in on the present date in question, all tickets up to the present date, all tickets for the month, and all tickets for the year. Depending on which of the fields is highlighted, the total number of relevant tickets appears at the bottom of this field 182 (e.g., 195 tickets in the illustrated drawing).

In the upper righthand corner of the screen 150 depicted in FIG. 10, there is a calendar 184 which obviously allows the user to select specific months and dates to obtain relevant ticketing information.

In the lower lefthand section 186 of the browser screen, there is an identification of the problem that has been reported by an on-board crew member. If the problem has already been transcribed, then the transcription appears in the section 186 of this screen. The loudspeaker icon 187 enables the user to listen to the problem in the reporting crew member's own words and appropriate play button icons 188 appear in this section of the screen 150 as depicted in the drawing figure.

Figure 11:
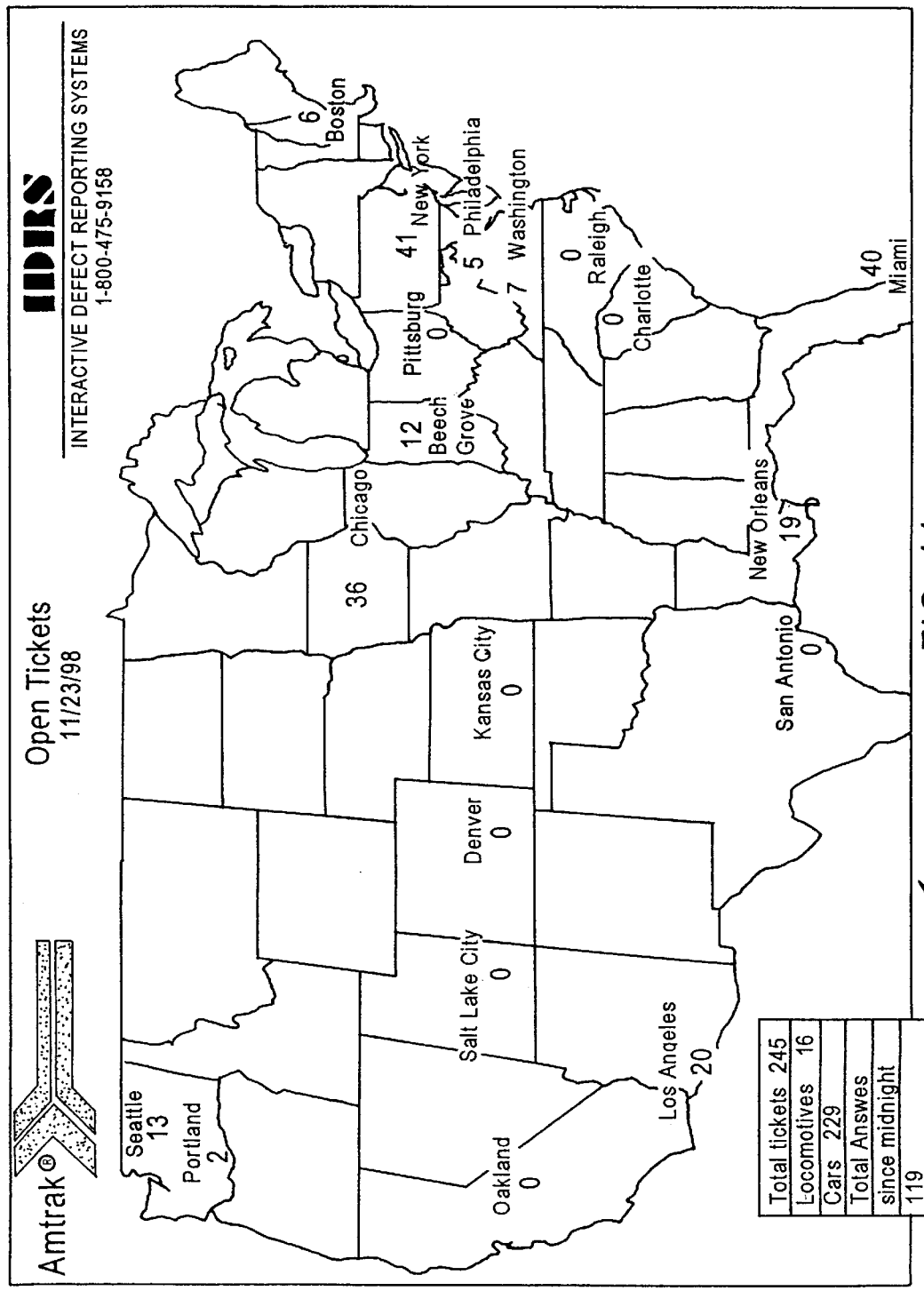
FIG. 11 is a map representation of open tickets in each of the repair facilities within the system.
Figure 12:
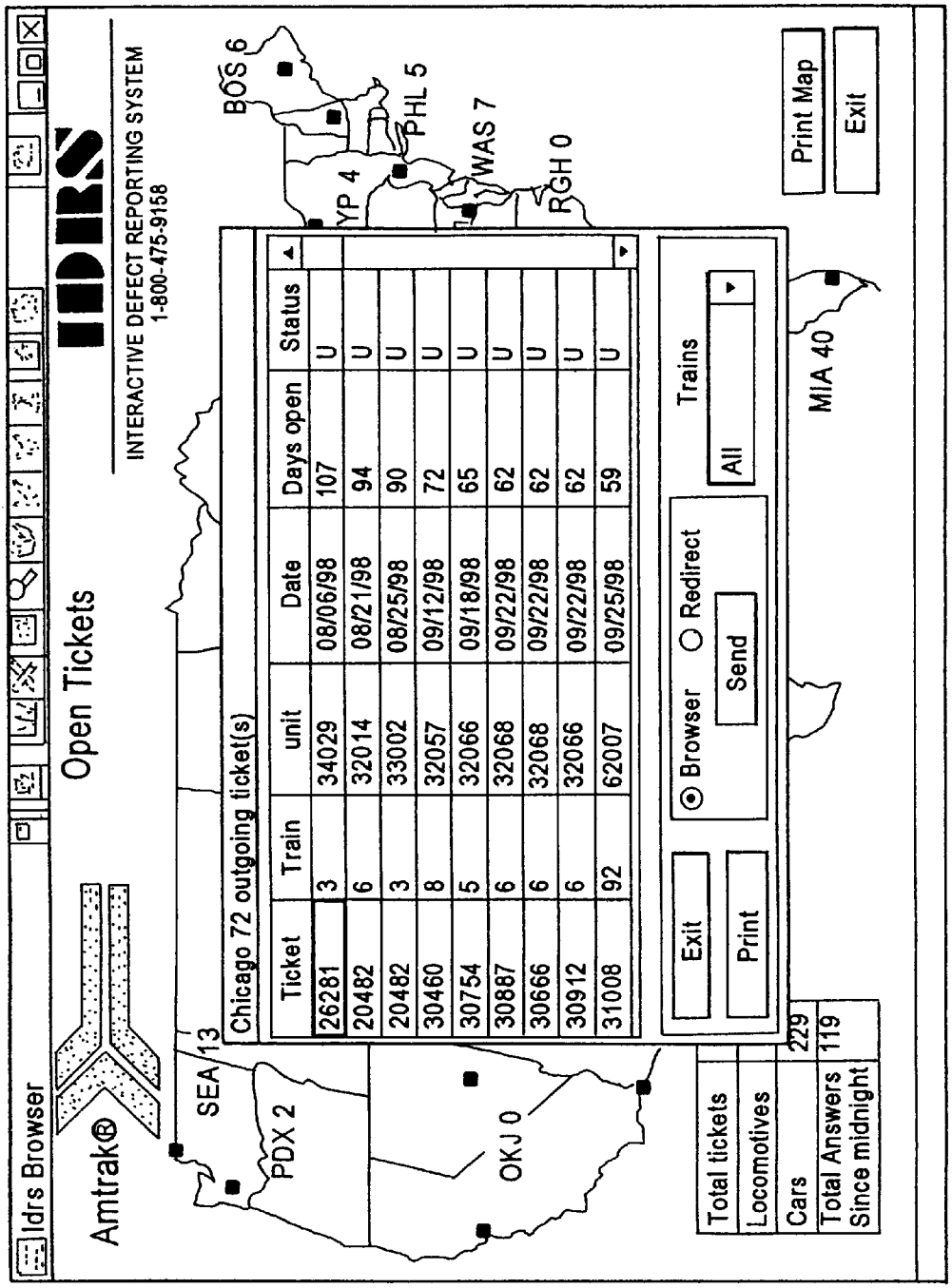
FIG. 12 is similar to FIG. 11 with a drop-down report generated as a result of clicking a particular facility in the map of FIG. 11.

At the bottom of the browser depicted in FIG. 10, there is a Map button 190. By clicking the Map button 190, a map 200 of the United States appears as depicted in FIG. 11 and the total number of open tickets is displayed for both locomotives and cars. In addition, the number of open tickets destined by each downline repair facility is displayed and the number of repair responses made since the previous day, for example, is also identified. If the user wishes to obtain specific information for a particular repair facility, the user simply double clicks the facility name at which time all open tickets are displayed as an overlay on the screen as depicted in FIG. 12. It is to be noted that the open tickets being displayed also include updated tickets in which some but not all repairs have been made.

Redirection Program

Figure 13:
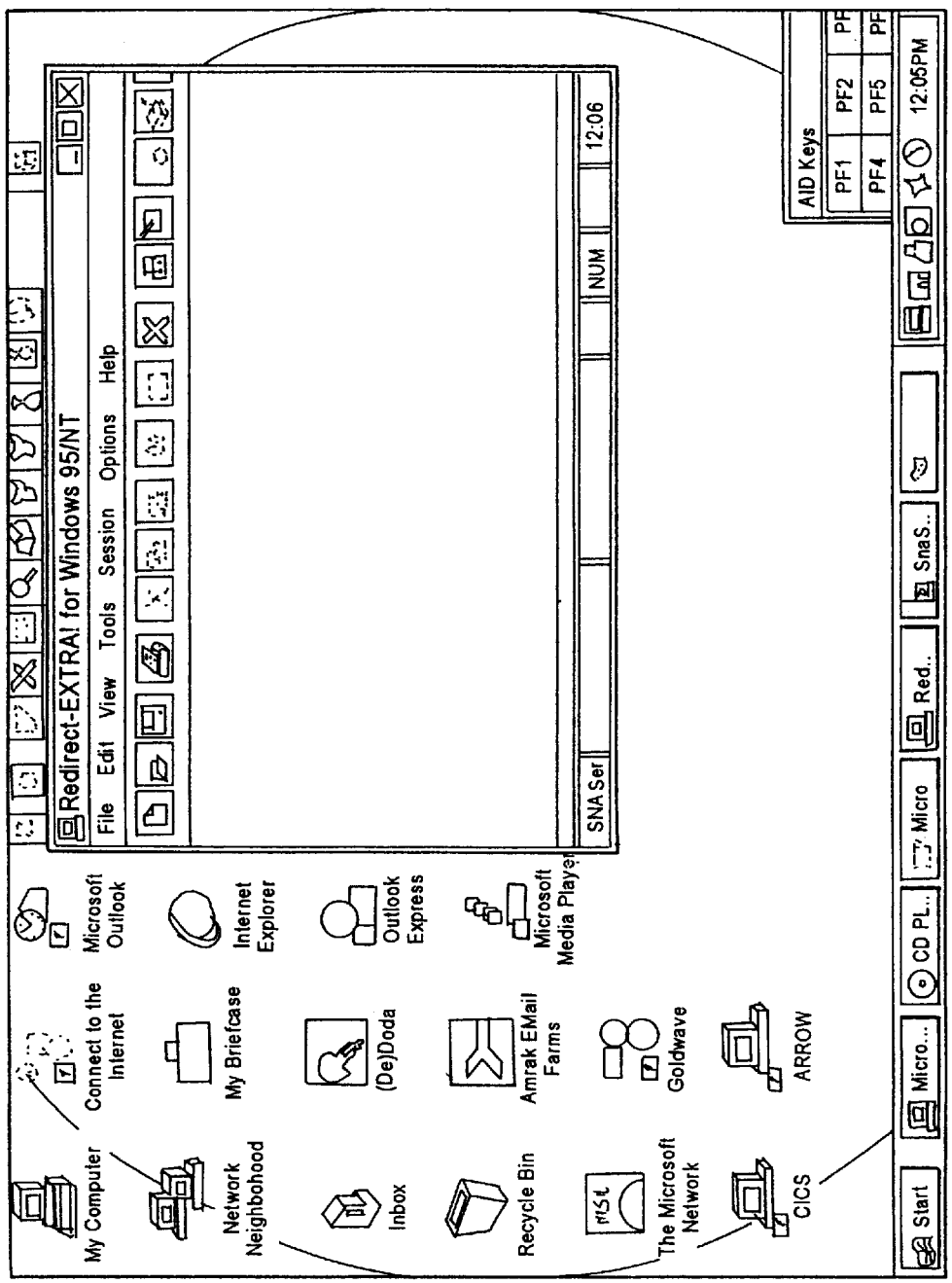
FIG. 13 is a computer screen displayed when running the Redirect program of IDRS.
Figure 14:
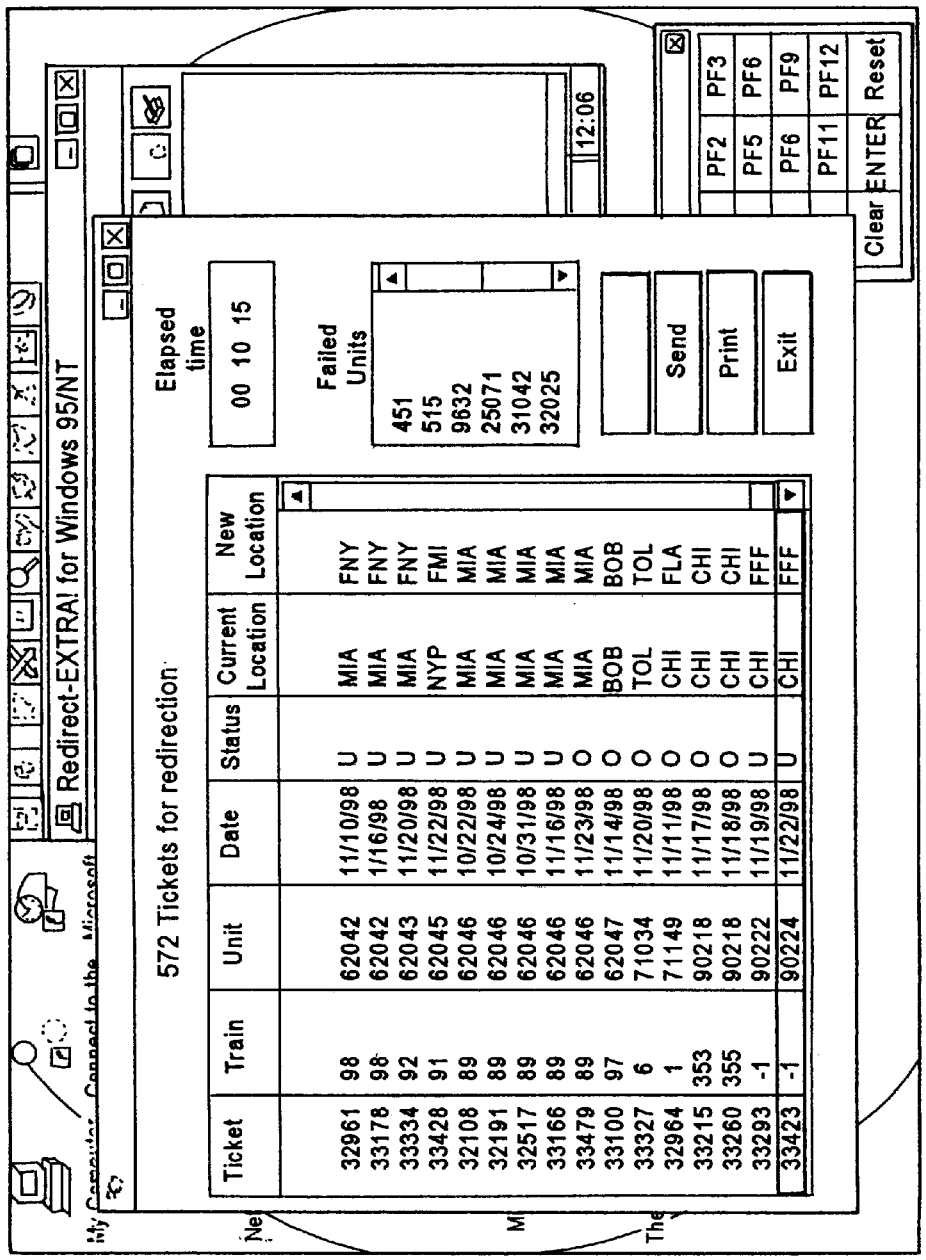
FIG. 14 is a screen indicating the future locations of units with open or updated Trouble Tickets relative to their current and future locations.

Since the fleet is in continuous daily use, a highly preferred and key feature of the present invention is the Redirect Program which has the capability of automatically accessing the ARROW system (see FIG. 13) in order to automatically update the open tickets (including the updated tickets) to identify the new or future location of a unit when it leaves its current location. FIG. 14 is an illustration of a screen 300 which may be displayed after the Redirect Program is run to indicate the current and future location of each open ticket by accessing the information in the ARROW system. The redirect software is preferably run three times a day so that each of three maintenance or repair shifts can have updated and therefore current information with respect to inbound trains and units having open tickets.

Within the fleet, it is common for units to be associated with the same train number. However, in the event a particular unit (i.e., car) becomes a part of a different train, the redirect software will advantageously identify the new train number as a result of interfacing with the ARROW system.

From the foregoing description, it will become apparent that IDRS has four programs associated with it:
  the main program;
  the transcription program;
  the browser program;
  and the redirect program.

With the exception of the Fax on Demand feature in which downline facilities must be identified for automatic receipt of a facsimile after a problem is immediately reported, or to run the Redirect program, both of which features require access to the ARROW system, the other programs and features of IDRS are capable of operation and data storage without access to the ARROW system.

It is to be understood that the Redirect program updates the open tickets automatically on a daily or thrice daily basis. However, the Redirect program may be operated in a manual mode by depressing the Start button appearing in the screen depicted in FIG. 14. After the Redirect program is operated, the redirect information in that screen may be automatically sent via facsimile to the new downline repair locations by clicking the Send button.

As mentioned briefly above, the main IDRS program runs on, for example, on OS/2 IBM operating system which stores the operating files described above. This operating system can run, for example, on a 200 MHz MMX computer preferably equipped with 196 megabytes of RAM with a 500 gigabyte hard drive. The operating system is linked directly to a similar computer system equipped with a ten megabyte hard drive to store the IDRS data files for use in conjunction with a Windows NT box. The Browser and Redirect programs identified above may be Visual Basic programs and a fourth program is a SYS PROD program which establishes a main frame connector link to access the ARROW/OMS system in order to upload and download information between IDRS and ARROW.

As also mentioned above, the ARROW system is an existing nationwide system used by Amtrak which contains train information, car information, ticket reservation information, unit maintenance and repair information, etc.

In view of the foregoing detailed description of both the IDRS programs and the interface requirements with the ARROW/OMS system, programmers of ordinary skill in the art will be able to develop the necessary software creating the data storage files used to achieve the functions described in detail hereinabove with respect to each of the four main programs.

It will now also be appreciated by persons skilled in the art that IDRS may be modified to report and track problems and repairs with respect to virtually any type of fleet other than railway cars, such as passenger and cargo delivery systems as may occur with the use of trucks, buses, taxis, aircraft, etc. With respect to each of these passenger and cargo delivery systems, it is to be understood that an IDRS type of system may be programmed to operate and be linked with an existing and possibly online nationwide system associated with the particular delivery system that allows for storage and tracking of basic information peculiar to fleet operation within that industry.

As mentioned briefly above, the operating system side of IDRS preferably includes a plurality of separate voice and fax lines to enable the system of users to report problems and repairs and request fax information as identified above. The operation system preferably includes software to display online the actual use of the voice and fax lines in real time.

As also mentioned above, it is also a preferred feature of this invention to generate one Trouble Ticket per car in which all problems associated with that car are reported on the specific ticket. This facilitates tracking and eventual repair of any one car. The purpose of coding the repairs is to create an OKI (okay for inspection) entry in the ARROW system to allow users to track in ARROW after the repair is made. The coding entries also enables audit of and cost of repairs being tracked. The repairs are coded only after completion. If no defect is found by a mechanic in response to a particular problem reported, there will be entered an entry item termed "No Action Required".

It is to be further understood that IDRS lends itself to the fact that different downline facilities may make different repairs at different times to a car until all repairs have been made and a ticket can be closed.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

What is claimed is:

1. A method for reporting defects and tracking repairs in one or more vehicles, comprising the steps of:
   (a) reporting a problem to an interactive computer based system by an on-board crew member accessing the system by utilizing a phone;
   (b) storing the problem on the system as a voice message;
   (c) providing advance notification to a maintenance facility towards which said vehicle is enroute
   (d) facilitating repair of the reported problem by enabling repair personnel to obtain a description of the problem by accessing at least one of (1) the voice message describing the problem; and (2) a transcription of said voice message; and
   (e) reporting the successful repair or other disposition of the problem to said interactive computer based system by said repair personnel or an authorized representative thereof utilizing a phone.

2. The method of claim 1, comprising the further step of assigning the reported problem a Trouble Ticket number.

3. The method of claim 2, wherein advance notification in accordance with claim 1, step (c) is provided by faxing a text message automatically generated by said computer based system to the downline facility, said text message including the Trouble Ticket number, vehicle identification information, and the date and time the problem was reported.

4. The method of claim 3, wherein said text message is faxed within a short predetermined time interval.

5. The method of claim 4, wherein said predetermined time interval is less than ten minutes.

6. The method of claim 1, comprising the further step of said interactive computer based system including a browser display and interface enabling an authorized user of said system, inclusive of said on-board crew member and repair personnel, to access information associated with said problem and repair status via computer.

7. The method of claim 1, comprising the further step of enabling users of said computer based system, inclusive of said on-board crew member and repair personnel to interrogate the system and obtain a facsimile of information associated with said problem which is automatically faxed by said computer.

8. The method of claim 1, comprising the further step of utilizing said interactive computer based system to update the computer data base on a predetermined or periodic basis to reflect the current maintenance facility to which said vehicle is enroute after said problem has been reported.

9. The method of claim 8, wherein said computer based system updates the location of said vehicle and the maintenance facility towards which said vehicle is enroute by accessing a computerized master system containing fleet information of which fleet said vehicle is a part of and current and future time table information tracking the present and further locations of said vehicle.

10. The method of claim 9, wherein said master computerized system is the ARROW system.

11. The method of claim 9, wherein said computer based system identifies a future train to which said vehicle is or will be a part of.

12. The method of claim 6, comprising the further step of enabling the user to access, via the Browser display, information indicative of ticket numbers representative of open tickets.

13. The method of claim 6, comprising the further step of enabling the user to access, via the Browser display, information indicative of ticket numbers representative of updated tickets.

14. The method of claim 6, comprising the further step of enabling the user to access, via the Browser display, information indicative of ticket numbers representative of closed tickets.

15. The method of claim 6, comprising the further step of providing a drop-down menu in the Browser display to enable the user to select one of all repair facilities intended to receive vehicles.

16. The method of claim 15, comprising the further step of enabling the user to select one of said facilities and have the Browser display indicate all open and updated tickets representative of vehicles to which said facility is a downline facility to which trains containing cars associated with said ticket numbers are enroute.

17. The method of claim 6, wherein said user can selectively search for one or more specific ticket numbers by clicking an appropriate button on the Browser display.

18. The method of claim 6, comprising the further step of enabling a user to browse for all tickets relating to a specific one of said vehicles.

19. The method of claim 6, comprising the further step of enabling the user to browse specific ticket numbers generated on a selected date or other time interval.

20. The method of claim 6, comprising the further step of enabling the user to listen to the problem in the reporting crew member's own words or listen to the repair of the problem in the repairman's own words.

21. The method of claim 6, comprising the further step of enabling the user to click a MAP button on the display to generate a map of a geographic area in which the total number of open tickets is displayed in association with a geographic representation of repair facilities to which vehicles associated with said open tickets are enroute.

22. The method of claim 21, comprising the further step of enabling the user to visualize open tickets associated with one of said visually represented downline facilities.

23. The method of claim 9, comprising the step of automatically updating, on a predetermined periodic interval, the identification of downline facilities to which cars having open or updated tickets are enroute.

24. The method of claim 23, comprising the further step of manually updating this information by depressing a START button icon appearing in a computer screen containing a Redirect program icon.

25. The method of claim 1, comprising the further step of providing a transcription clerk with a computer screen visual representation of ticket numbers containing one of problems and repairs in need of transcription.

26. The method of claim 25, comprising the further step of providing the transcription clerk with another computer screen containing a plurality of buttons which the transcription clerk can actuate to hear the message as well as rewind, fast forward, and pause the message as desired by said transcription clerk.

27. The method of claim 26, comprising the further step of providing the transcription clerk with a display area on the computer screen on which the transcribed text is displayed.

28. The method of claim 27, comprising the further step of providing the transcription clerk with a computer screen containing coding information, displayed adjacent the transcribed information indicative of transcribed repairs, to enable said transcription clerk to selectively identify a coding description which is representative of the repair being made.

29. The method of claim 1, wherein said vehicles are railway cars and railway locomotives.

30. The method of claim 1, wherein said vehicles are passenger aircraft.

31. The method of claim 1, wherein said vehicles are cargo aircraft.

32. The method of claim 1, wherein said vehicles are passenger buses.

33. The method of claim 1, wherein said vehicles are automotive trucks.

34. A system for reporting defects and tracking repairs in one or more vehicles, comprising:
  (a) computerized data base system accessible by telephony;
  (b) means, interactive with said computerized data base system, for storing a voice message containing information reporting a defect in said vehicle;
  (c) means, interactive with said data base system, for storing a voice message indicative of a repair of the problem reported by said voice message; and
  (d) means, interactive with said computerized data base system, for enabling authorized users of said system to selectively listen to at least one of said voice message problems and voice message repairs.

* * * * *